United States Patent [19]

Takada

[11] 4,369,990
[45] Jan. 25, 1983

[54] COUPLING ASSEMBLY FOR CONNECTING A SLIDER TO A DRIVE WIRE IN A PASSIVE VEHICLE OCCUPANT RESTRAINT BELT SYSTEM

[76] Inventor: Juichiro Takada, 3-12-1, Shinmachi, Setagayaku, Tokyo, Japan

[21] Appl. No.: 249,998

[22] Filed: Mar. 30, 1981

[30] Foreign Application Priority Data

Apr. 1, 1980 [JP] Japan .................... 55-042410[U]

[51] Int. Cl.³ ............................................. B60R 21/10
[52] U.S. Cl. .................................... 280/804; 403/274; 403/284
[58] Field of Search ................. 280/804; 403/34, 373, 403/374, 284, 285, 274, 242

[56] References Cited

U.S. PATENT DOCUMENTS

| 1,642,314 | 9/1927 | Stecke | 403/242 |
| 4,234,210 | 11/1980 | McNally et al. | 280/804 |
| 4,256,331 | 3/1981 | Schwanz | 280/804 |
| 4,296,943 | 10/1981 | Takada | 280/804 |
| 4,324,419 | 4/1982 | Ueda | 280/804 |

FOREIGN PATENT DOCUMENTS 2923305 12/1979 Fed. Rep. of Germany ...... 280/804

*Primary Examiner*—Joseph F. Peters, Jr.
*Assistant Examiner*—Dennis H. Pedder
*Attorney, Agent, or Firm*—Brumbaugh, Graves, Donohue & Raymond

[57] ABSTRACT

A coupling assembly for connecting a plastic-covered drive wire to a slider in a passive vehicle occupant restraint belt system comprises an uncovered segment of the core at the end of the drive wire, a pressed-on coupling ring affixed to the uncovered segment and a coupling sleeve on the slider that is pressed onto the coupling ring and onto a portion of the drive wire covering adjacent the uncovered segment. Damaging concentrated bending stresses in the drive wire core adjacent the coupling ring are eliminated due to support of the core by the covering portion within the sleeve.

1 Claim, 5 Drawing Figures

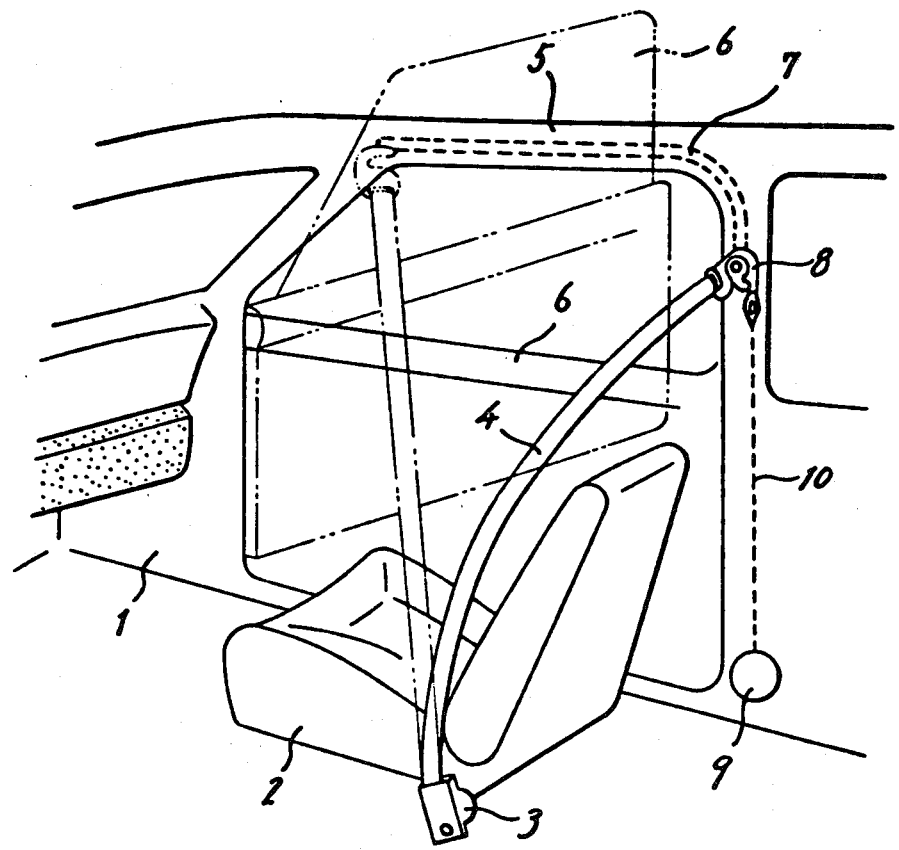
FIG. 1
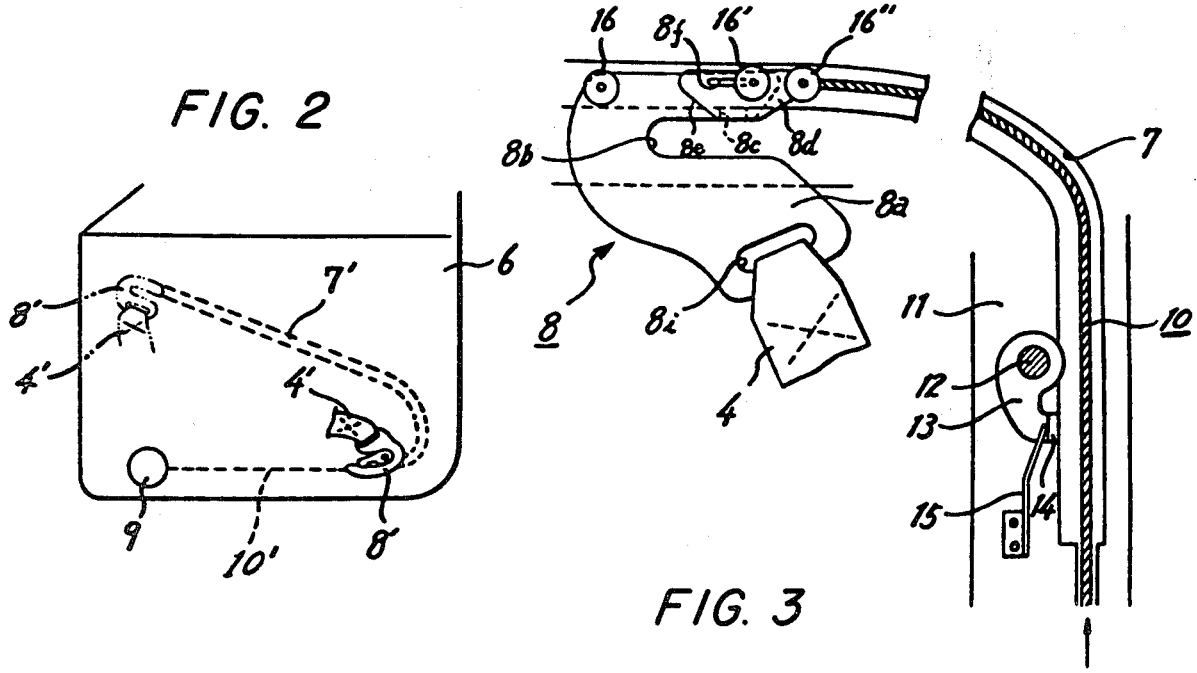
FIG. 2
FIG. 3

4,369,990

COUPLING ASSEMBLY FOR CONNECTING A SLIDER TO A DRIVE WIRE IN A PASSIVE VEHICLE OCCUPANT RESTRAINT BELT SYSTEM

FIELD OF THE INVENTION

The present invention relates to an improvement in passive vehicle occupant restraint belt systems and, in particular, to a coupling assembly for connecting a slider to a drive wire in a manner which substantially reduces concentrated stresses that in the past have presented a risk of early failure of the connection.

BACKGROUND OF THE INVENTION

Numerous proposals have been made in recent years for so-called passive vehicle occupant restraint belt systems, that is, restraint belt systems designed to transfer automatically between a restraining configuration and a releasing configuration in response to opening and closing of the vehicle door. Many of those proposed systems have a guide rail mounted generally above the vehicle door, on the lower portion of the vehicle door or somewhere along the center of the vehicle inboard of the seat and a slider that carries either a moving anchor or belt guide that moves along the guide rail to transfer the belt between the restraint and release configurations. The slider, in turn, is connected to a drive wire that drives it along the rail. In many cases, the guide rail is curved, sometimes rather sharply.

When the slider and the portion of the drive wire that moves along the guide rail traverse the curved portion of a curved guide rail, the drive wire is subjected to bending. The drive wire, of course, is semi-flexible and reasonably capable of enduring the normal bending stresses. However, in the common way of fastening the drive wire to the slider, namely by a pressed-on fitting, the bending of the drive wire at the point where it is joined to the slider produces a highly concentrated stress. Such concentrated stress, when applied over numerous cycles, can produce failure of the drive wire at the point where it is fastened to the slider.

One possible solution to the problem is to minimize or eliminate bends in guide rails, thus avoiding the stress concentration problem altogether. However, there are various belt passive restraint belt systems in which it is highly advantageous to have a fairly sharp curve in the guide rail. Examples of such systems are described below and illustrated in the accompanying drawings.

SUMMARY OF THE INVENTION

There is provided, in accordance with the present invention, an improved coupling assembly for connecting a slider to a drive wire in a passive vehicle occupant restraint system. The coupling assembly is particularly adapted for use in a belt system that includes a guide rail affixed to a vehicle body portion and carrying a slider that receives a portion of a restraint belt and is driven by a drive wire along the guide rail to transfer the belt portion between restraint and release locations. The portion of the drive wire that moves along the rail has a core and a covering of a polymeric material, preferably a low friction material that facilitates movement of the wire along the rail as well as making such movement quieter and minimizing wear on the wire and the rail.

In accordance with the present invention, the coupling assembly comprises an uncovered segment of the core adjacent the end of the drive wire having a pressed-on coupling ring securely affixed thereto. A coupling sleeve that forms a part of or is suitably attached to the slider is received over the pressed-on coupling ring and over a portion of the drive wire covering adjacent the uncovered segment of the drive wire. The sleeve is pressed onto both the coupling ring and the covering portion that underlies the sleeve. The pressed fit between the coupling ring and the sleeve provides a durable mechanical attachment between the drive wire and the slider. The pressed fit between the coupling sleeve and the underlying portion of the covering onto which the sleeve is pressed provides support for the drive wire at the critical location adjacent the coupling ring, thereby eliminating the concentrated bending stresses on the core adjacent the coupling ring.

For a better understanding of the present invention, reference may be made to the following description of an exemplary embodiment, taken in conjunction with the figures of the accompanying drawings.

DESCRIPTION OF THE DRAWING

FIG. 1 is a schematic pictorial view of an exemplary passive restraint belt system in which the present invention may be used to considerable advantage;

FIG. 2 is a generally schematic elevational view of another passive restraint belt system in which the present invention can be used advantageously;

FIG. 3 is an elevational view in generally schematic form of a moving anchor and a locking mechanism suitable for the systems shown in FIGS. 1 and 2;

DESCRIPTION OF EXEMPLARY EMBODIMENT

Figure 4:
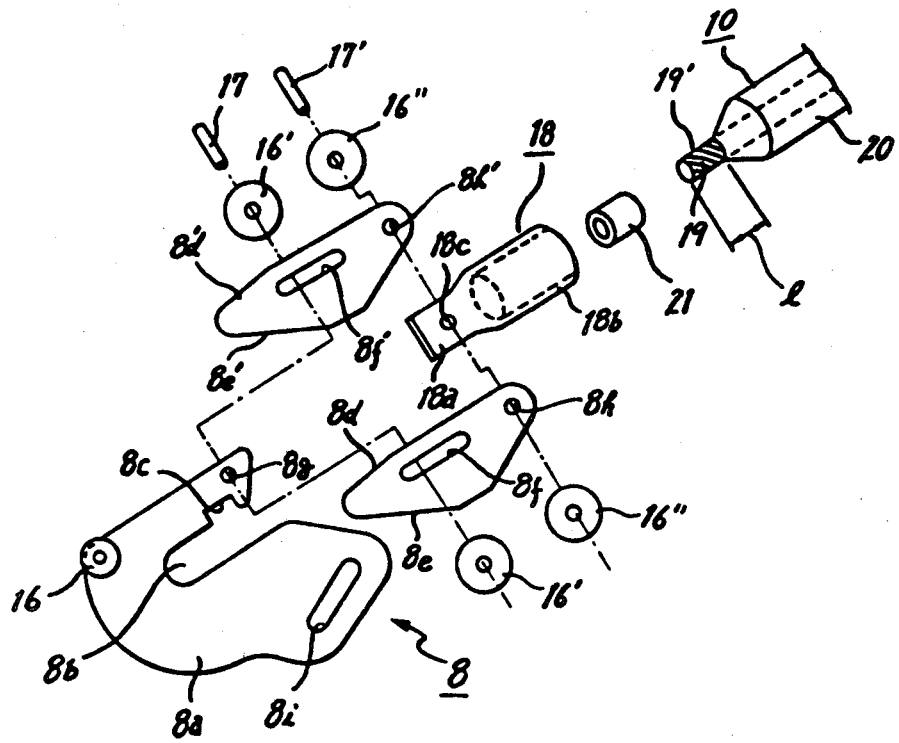
FIG. 4 is an exploded pictorial view of the slidable moving anchor shown in FIG. 3 and including an exemplary embodiment of a coupling system made in accordance with the present invention.

In the passive restraint system shown in FIG. 1, a shoulder belt 4 leads from an emergency locking retractor 3 affixed to the vehicle body 1 at a location at the lower rear of the seat 2 upwardly and outwardly across the seat to a moving anchor 8. The moving anchor includes a slider and is arranged to move along a guide rail 7 that is affixed to vehicle body 1 at a location adjacent the roof 5 and generally above the vehicle door 6. The moving anchor 8 is connected to a drive wire 10. The drive wire 10, in turn, is driven by a gear-reduced motor 9 between a restraint position (shown in solid lines in FIG. 1) located along the center pillar part-way down the rear edge of the door opening and a release location (shown in phantom lines in FIG. 1) at the forward end of the guide rail adjacent the upper end of the front pillar. The drive motor 9 operates in response to opening and closing motions of the door and automatically transfers the moving anchor 8 to the restraint location when the door is closed and transfers it to the release location when the door is open. In the restraint location of the moving anchor, the belt 4 passes across the torso and over the shoulder of the occupant and upon locking of the retractor 3 in an emergency situation restrains the passenger's upper body. The lower body is protected by an energy-absorbing knee bolster located under the dash board.

As shown in FIG. 2, other types of passive systems use a moving anchor 8' at the outboard end of a lap belt 4'. The moving anchor 8' moves along a guide rail 7' between a restraint location adjacent the lower rear corner of the door 6 (solid lines in FIG. 2) and a release location near the upper front corner of the lower door panel (phantom lines in FIG. 2). A gear-reduced motor or a mechanical motion amplifier 9 installed in the door drives the moving anchor 4' by means of a drive wire 10'.

Figure 5:
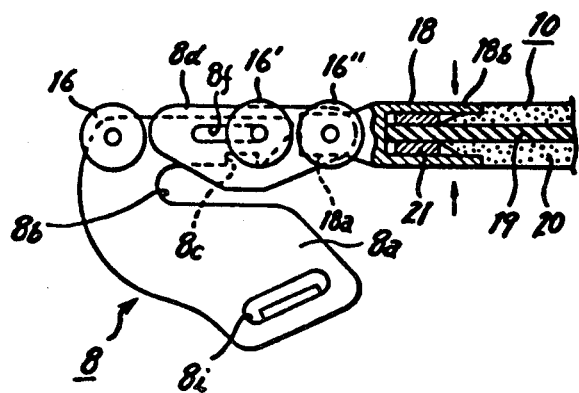
FIG. 5 is an elevational view of the embodiment shown in FIG. 4 in the assembled condition, a portion of the coupling assembly being broken away in cross-section.

It is, of course, desirable to lock the moving anchor in the restraint location. The devices shown in FIGS. 3 to 5 are suitable for that purpose and can be used in either of the embodiments shown in FIGS. 1 and 2. The moving anchor 8 runs along a generally tubular guide rail 7 of generally C-shaped cross section that is installed with the slotted wall generally facing the door opening. The moving anchor 8 includes an anchor plate 8a suitably shaped to define a notch 8b adjacent a leg that has a slot 8i through which the free end of the shoulder belt 4 is passed and then turned back on the incoming portion and stitched, thereby to fasten the outboard end of the belt to the anchor plate 8a. The notch 8b is further defined by a slider portion of the anchor plate 8a that is received through the slot in the guide rail 7. Rollers 16 on the slider portion of the anchor plate 8a run along the flanges of the guide rail on either side of the slot.

The slider portion has a locking notch 8c that receives a locking lug 14 on a locking pawl 13 that is pivotably mounted on a strong anchor pin 12 affixed to the center pillar 11 at the restraint location of the moving anchor. When the moving anchor moves to the restraint location, an oblique camming edge 8d on the slider portion of the moving anchor plate 8a pushes the locking lug 14 on the pawl 13 outwardly against the restoring force of a leaf spring 15. When the locking notch 8c on the slider portion of the anchor plate is in alignment with the locking lug 14, the spring 15 pushes the locking pawl 13 into locking engagement in the notch 8c. Meanwhile, the locking notch 8b on the anchor plate 8a receives the anchor pin 12. In the event of a collision, sudden stop, or other emergency the force applied to the belt when the vehicle occupant is thrown forward is transmitted from the anchor plate to the anchor pin 12.

The locking assembly of the moving anchor 8 also includes a release cam assembly that comprises a pair of cam plates 8d and 8d' connected to the slider portion of the anchor plate 8a for limited relative motion by a pin 17 that passes through a hole 8g in the slider portion of the anchor plate and through elongated slots 8f and 8f' in the respective cam plates. The pin 17 also serves as an axle for a pair of rollers 16' that roll along the flanges of the guide rail 7 on either side of the slot.

The release cam assembly of the slider is connected to the drive wire 10 in a manner described below by a coupling sleeve 18 that has a flattened porton 18a having a hole 18c. A coupling pin 17' passes through holes 8h and 8h' in the respective cam plates 8d and 8d' and the hole 18c in the flattened portion 18a and also serves as an axle for another pair of rollers 16" that ride along the guide rail flanges.

When the drive wire 10 is pulled downwardly by the drive motor 9 in the process of moving the moving anchor toward the restraint location, the cam plates 8d and 8d' move relative to the anchor plate 8a in a direction away from the anchor notch 8b and into a position in which the coupling pin 17 is located at the left ends of the aligned pair of notches 8f and 8f' in the respective cam plates. In that position the locking notch 8c is uncovered and able to accept the locking lug 14 on the pawl 13. When the drive wire 10 is driven upwardly by the motor 9, the cam plates 8d and 8d' are pushed upwardly, thereby engaging corresponding camming surfaces 8e and 8e' with the locking lug 14 on the pawl 13 and, as movement of the cam members progresses, the camming surfaces cam the pawl 13 outwardly to release it from the locking notch 8c in the anchor plate 8a. At the end of the lost motion between the cam plates and the anchor plates, the coupling pin 17 is engaged by the right ends of the slots 8f and 8f', thereby transmitting motion of the cam plates to the anchor plate. As shown in FIG. 3, the anchor assembly is pushed from right to left along the guide rail to the release location.

The coupling assembly by which the drive wire 10 is connected to the slider portion of the moving anchor is constructed in accordance with the present invention. The portion of the drive wire that moves slideably in and out of the guide rail 7 includes a stranded core 19 and a covering 20 of a polymeric material, such as nylon, which preferably provides low friction, is moderately compressable and flexible and is durable against abrasion. Such a covering of polymeric material reduces noise, facilitates sliding of the moving anchor assembly and of the wire itself along the rail, imparts stiffness to the core wire 19 and reduces wear of both the rail and the drive wire. The portion of the drive wire that is driven by the motor 9 is preferably a racked wire made up of a core spirally wound with a tooth wire. Such racked wires are well known and need not be further described or illustrated in the drawing.

The coupling assembly comprises an uncovered segment 19' at the end of the core wire 19 that is preferably produced by stripping back the covering 20 for a short distance, as indicated by the letter L in FIG. 4. The uncovered segment 19 receives a pressed-on coupling ring 21. The ring 21 is initially large enough to be easily slipped onto the stripped uncovered segment 19' and then secured to the segment 19' by a suitable tool or press that forms a pressed fit.

The coupling sleeve 18 includes a sleeve portion 18b that is initially of an internal diameter large enough to enable it to be accepted over the coupling ring 21 and a small segment of the drive wire covering 20 adjacent the coupling ring (see FIG. 5). After the coupling ring 21 and adjacent segment of the covering are inserted into the sleeve 18b, the sleeve 18b is pressed on to both the coupling ring and the portion of the covering 20 received within it. The pressed fit thus obtained is represented by the arrows in FIG. 5 and provides a strong mechanical attachment of the drive wire by the press fit between the sleeve 18 and the coupling ring. In addition, the press fit between the sleeve portion 18b and the short length of covering material 20 adjacent the coupling ring 21 provides a zone of support for the core wire 19 in the critical region immediately adjacent the coupling ring 21. The polymeric material embraced within the sleeve portion 18 provides a zone of transition between the substantially rigid segment of the core wire 19, where it is embraced by the coupling ring, and the unsupported normal portion of a drive wire entirely outside the sleeve 18b. Accordingly, concentrated stresses due to bending are substantially reduced, and the risk of breakage due to fatigue bending failure of the core wire is virtually eliminated. Thus, the useful life of the moving anchor and drive wire assembly is substantially increased. The coupling assembly can endure the repeated movements around even the rather sharp bends in the guide rails in systems constructed in accordance with FIGS. 1 and 2. The moving anchor and latch systems employed in those restraint systems have the advantage of being small in size and yet very strong due to the acceptance of a relatively simple lock pin, e.g., the pin 12, within a locking notch 8b in the anchor plate. However, proper engagement between the anchor pin and the anchor notch require turning the moving anchor by movement along a curved path between the release location and the restraint location. Accordingly, the present invention solves an important problem and in so doing, makes possible the use of highly effective restraint systems that employ curved guide rails.

A coupling assembly, according to the present invention, also has the advantage of being comparatively easy to produce and of low cost. It is merely necessary to strip away a small length of the covering at the end of the guide wire, slip on the coupling ring and press it in place, and then insert the terminal end of the drive wire into the sleeve portion of the coupling sleeve 18 and perform the final pressing operation on the coupling sleeve. The coupling assembly is of small size and is geometrically well adapted to move easily and quietly through the guide rail.

Although it is advantageous for the coupling sleeve 18 to be pivotably attached (by the pin 17') to the cam plates 8e and 8e', it is also possible for the coupling sleeve to be a portion of one of the cam members or for the cam member or other form of slider to be otherwise formed integrally with a coupling sleeve.

The use of the present invention is by no means limited to the restraint systems shown in FIGS. 1 and 2 or to the slider arrangement shown in FIGS. 3 and 5. The coupling assembly can be used with any sort of slider, including various types of moving anchors, as well as sliders used with movable belt rings by which a segment of a belt is transferred between a restraint and release location, but in which the free end of the belt is attached other than by a moving anchor to the vehicle body. Accordingly, it is to be understood that the above-described embodiments of the invention are merely exemplary, and numerous variations and modifications will be readily apparent to those skilled in the art without departing from the spirit and scope of the invention.

I claim:

1. In a passive vehicle occupant restraint belt system that includes a guide rail affixed to the vehicle body, a slider receiving a portion of a restraint belt and movable along the guide rail to transfer the belt portion between restraint and release locations, and a drive wire driven by drive means and coupled to the slider, the portion of the drive wire that moves along the rail having a core and a covering of a polymeric material, a coupling assembly comprising an uncovered segment of the core adjacent the end of the drive wire, a pressed-on coupling ring affixed to the uncovered segment of the drive wire and a coupling sleeve connected to the slider received over the coupling ring and over a portion of the drive wire covering adjacent the uncovered segment, the sleeve being pressed onto the coupling ring and said covering portion, whereby concentrated bending stresses in the core adjacent the coupling ring are eliminated due to support of the core adjacent the coupling ring by said covering portion within the sleeve.

* * * * *